Dec. 8, 1964 K. A. HELLANDER 3,160,733
AUTOMATIC WELDING APPARATUS
Filed Dec. 28, 1961 3 Sheets-Sheet 1
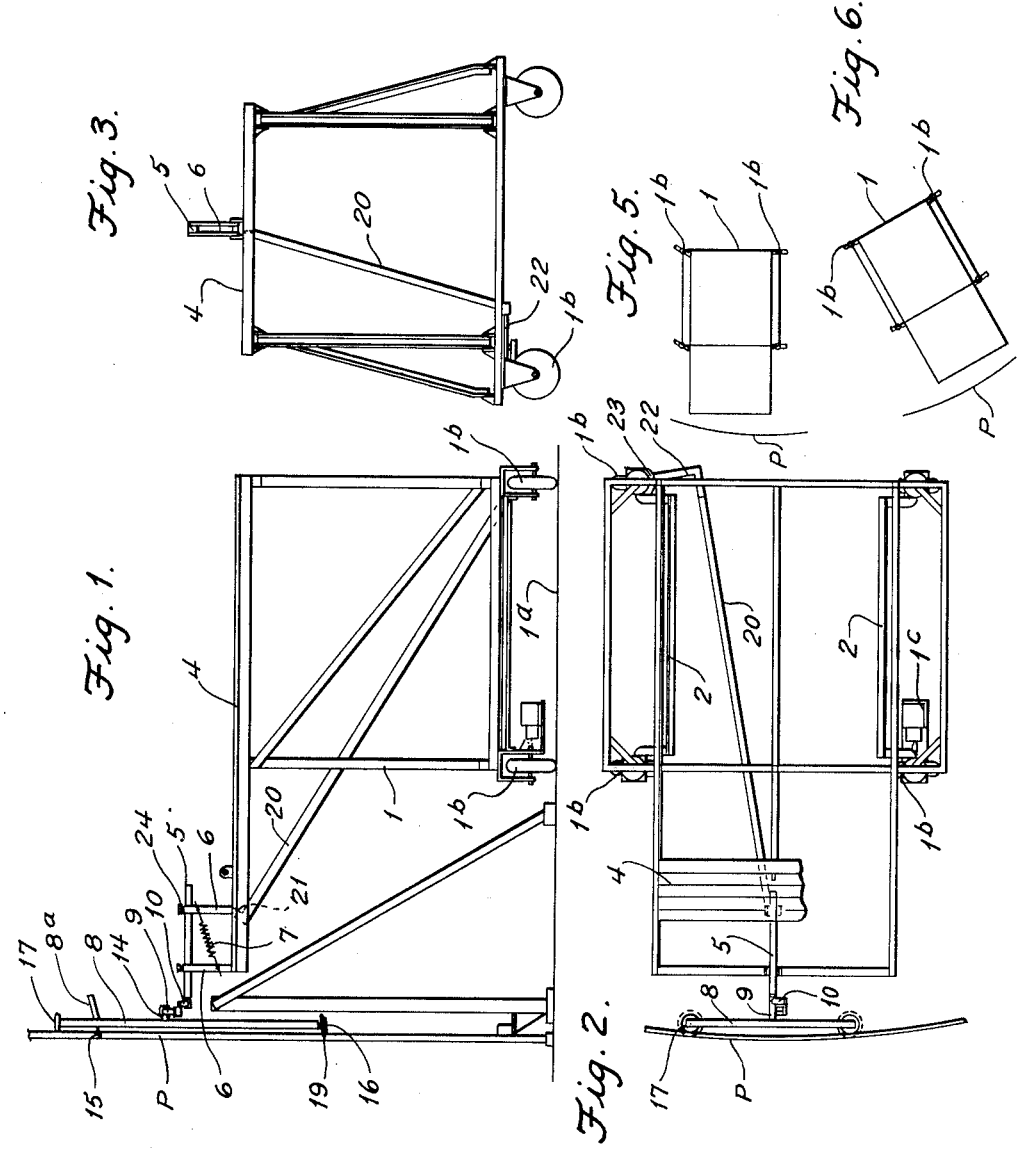
INVENTOR.
KARL ALBERT HELLANDER
BY
ATTORNEY.

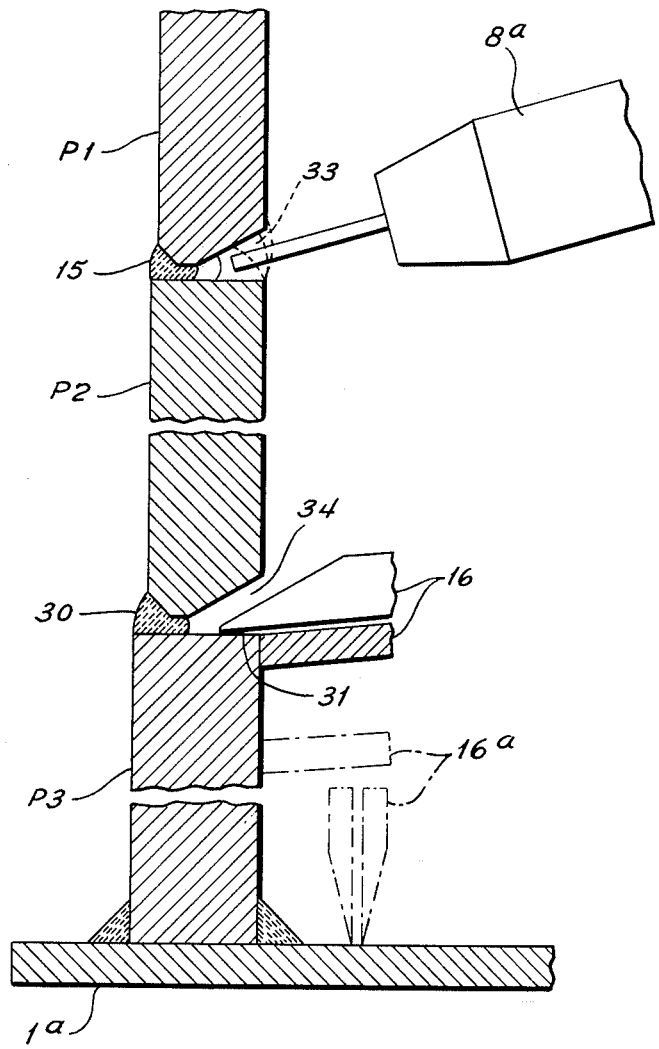

ns Patent Office
3,160,733
Patented Dec. 8, 1964

3,160,733
AUTOMATIC WELDING APPARATUS
Karl Albert Hellander, Lerum, Sweden, assignor to Rodo-verken Svenungsson & Co., Gothenburg, Sweden, a corporation of Sweden
Filed Dec. 28, 1961, Ser. No. 162,715
11 Claims. (Cl. 219—125)

There are on the market two different methods of building large tanks. According to the older method the lower shell belt of the tank is first welded, and with the help of scaffolding several belts are built on to the lower belt until the full height of the tank has been achieved. According to the second method, the upper part of the tank is the first to be begun; it is welded together on the ground and by means of lifting jacks it and the succeeding tank parts are raised upwardly and in due course the various cylindrical shell belts are joined to the previous ones. According to one type of the second method a bottom belt is welded or otherwise fixed to a base or foundation of the tank, and the upper edge of the bottom belt forms one turn of a helix. The top part of the tank, which has one belt, is then completed. The bottom edge of the top belt also forms one turn of a helix. The top part of the tank is carried on the helical upper edge of the bottom belt by hydraulical lifting devices. To begin with the vertical edge at the end of the helix of the bottom belt is adjacent the vertical edge at the end of the helix of the top belt. The lifting devices are operative to raise the top part and rotate it through a small angle so that a gap is left between the vertical edges of the top and bottom belts. A plate is welded to the top belt in the gap thus formed; and this procedure is continued until the desired height of the tank has been obtained.

In order to be able to use automatic welding there is required an auxiliary support device which carries the welding apparatus, moves it around the tank and guides the welding head at the correct speed and in such a way that the welding rod is exactly opposite the weld joint which is to be filled. If the tank is built according to the first mentioned alternative there are no great problems in using an automatic welding device since, in this case, the upper edge of the shell belt may be used as a guide device and travelling track for the support device. This system is however excluded from use if the shell belts are to be successively raised according to the second method, since the distance from the upper edge of the belt to the weld joint varies with each newly begun shell belt. In this case, the welding is effected at the lower edge of the previously welded upper belt and the upper edge of the plate of the new belt being welded, and there is therefore no travelling track which can carry the support device. Furthermore, although it is possible to visualise guiding the support device by the joint between the plates being welded, this has proved to be impossible in practice since several welding beads are required to fill a joint completely. The remaining surfaces of the joint after a welding bead are so arranged that they cannot serve as a guide groove for a roller or the like.

The present invention relates to an auxiliary vehicle which renders possible the automtaic welding of tanks build in accordance with the latter alternative. According to the invention the auxiliary vehicle which carries the welding apparatus is adapted to be driven around the tank by a drive machinery on the base or foundation of the tank and is pivotally connected to a support device which is guided towards and adjacent the shell belt and which carries one or more welding heads adapted for welding of the shell belts. The said pivotal connection is conveniently so constructed that it permits fairly small relative movements between the auxiliary vehicle and the support device both in a radical and a peripheral direction. Such movements may be caused by irregularities in the drive path of the vehicle or by differences between the movements of the vehicle and support device. The vehicle may drive the support device around the periphery of the shell belt, but as a rule it is more convenient to provide the vehicle and the support device with separate, possibly synchronised, motors, whose r.p.m. are as alike as possible. Any possible differences in the driving speeds of the vehicle and support device are taken up by the said pivotal connection. In addition the vehicle may be provided with steerable wheels which are automatically adjustable to a correct angular position corresponding to the curvature of the tank shell by actuation of a connection member movable in accordance with this curvature.

An embodiment of the invention is shown diagrammatically in the accompanying drawings, in which FIGURE 1 shows the auxiliary vehicle viewed from the side, FIGURE 2 the vehicle seen from above, and FIGURE 3 the vehicle seen from the end.

FIGURES 5 and 6 show two different wheel positions in the vehicle.

FIGURE 7 shows on a larger scale a modification for welding of the bottom cylindrical belt.

Figure 4:
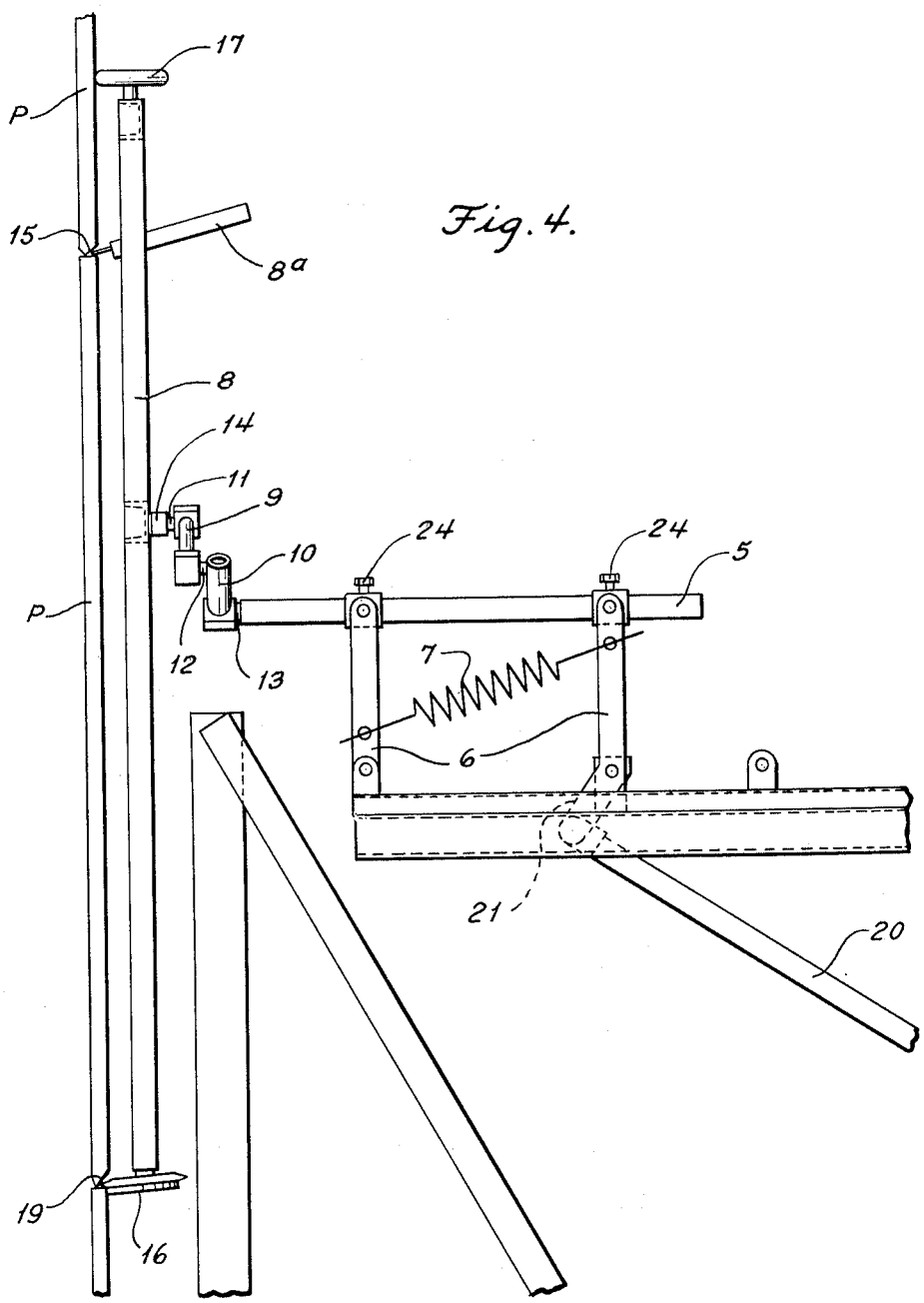
FIGURE 4 shows the linkage connection on a larger scale.

In the drawings there is shown a motor driven vehicle 1 which runs on the base 1a of the future tank. The vehicle may be within or outside the future tank. The tank is built by the shell belts being welded around the tank by work performed on the ground and, after they have been welded to the shell belt immediately above, they, together with the latter, are raised upwardly by hydraulic or other jacks or devices of a suitable type so that the plates of the next shell belt may be mounted in this position beneath the belt immediately above it. The vehicle which in the drawings is mounted within the future tank has, for example four wheels 1b, which are connected together in pairs by parallel shafts 2, 3 one of which is driven by a motor 1c. The necessary equipment for automatic welding is located on the platform 4 of the vehicle. The platform also has space for a machinery operator.

A push rod 5 is movably journalled in two parallel links 6. Between the links a powerful tension spring 7 is mounted, which with a certain force biases the push rod 5 outwardly in a radial direction in relation to the centre of the future cylindrical tank. This force is transmitted to a welding carriage by two linkage arms 9, 10 having pivotal horizontal connections 11, 12, 13 which permit the linkage arms 9, 10 to swing in the vertical plane. A rubber spring 14 finally joins the pivotal connection 11 to the welding carriage 8. The function of this carriage is to support the welding head 8a for welding of the joint 15 between two adjacent plates P in the shell belt which is being welded. The carriage 8 is also provided with two lower guide rollers 16 which run in an already completed weld joint 19 between the plates and two upper abutment rollers 17, which abut against the plate above the weld joint 19. One of the two lower guide rollers 16 is driven by a motor whose r.p.m. are steplessly controlled and whose function is to drive the welding carriage 8 around the tank. The rollers 16 run in the weld joint and provide support for the carriage 8 in a vertical direction. The weld joint 19 is parallel to the weld joint 15, and consequently the welding head 8a, which is mounted on the carriage 8, is the whole time immediately opposite the weld joint 15 during the movement of the carriage around the tank.

The welding carriage 8 requires for each individual welding head a certain speed which is controlled by its own motor. The drive motor 1c of the vehicle 1 is of such a character that it follows the speed of the welding carriage 8 within a certain tolerance range, for example ±0.1 metre so that the welding carriage is never more than 0.1 metre from its centre position on the vehicle 1. There may possibly be a certain synchronisation of the motors. The difference between the speeds of the vehicle 1 and welding carriage 8 and the movements of the vehicle 1 in a vertical direction (caused by unevenness in the tank base) and the push rod 5 movements in the same direction (caused by pivotal movements of the parallel links 6 in a vertical plane) are taken up by the links 9 and 10.

Minor deviations from the correct angle between the vertical plane of the welding carriage 8 and the horizontal plane of the vehicle 1 and between the radial direction of the vehicle 1 and the tangent to the mounting point of the link 9 on the carriage 8 are taken up by the rubber spring 14.

The rubber spring 14 may of course be replaced by a universal joint or other pivotal connections, but it also performs the function of preventing vibrations from the vehicle 1 being transferred to the carriage 8. Furthermore it ought to be observed that the linkage connection 9, 10 may be replaced by a universal joint construction.

In order that the vehicle 1 during its movement around the tank should be able to follow the curvature of the shell without any manually operated steering devices being required, a rod 20 connects an extension 21 on one of the linkage arms 6 with a steering arm 22 for controlling the angular position of the wheels 1b. The steering arm 22 is adjustably connected to a carrier for the front pair of wheels and can be locked in a point 23 in the desired steering position.

FIG. 6 shows how the vehicle 1 is located a suitable distance from the shell P, and the rear pair of wheels adjusted in such a manner that it follows the desired radius, whereafter this pair of wheels is locked in the vehicle 1. The front pair of wheels, which is movable, is adjusted in a similar manner and the steering arm 22 is then locked to the latter pair of wheels in the point 23 when the links 6 are (approximately) in the vertical mid-position of their range of movement.

The welding carriage 8 is located in its position against the shell, after which the connection links 14, 9, 10 and the push rod 5 are mounted and the latter locked to the parallel links 6 by screws 24. The spring 7 is fitted so that it biases the spush rod 5 with a radially outwardly directed force. When the vehicle 1 and carriage 8 move around the shell, the radial distance of the vehicle 1 from the shell is controlled within relatively narrow limits by the link connection 21, 20, 22. If the vehicle 1 should acquire a tendency to move away from the shell (compare FIGURES 5 and 6), the rod 5 is moved relatively to the vehicle 1, and the linkage connections 21, 20, 22 turn the fron wheels 1b in a direction towards the shell. The resilient force of the central wheel of the carriage 8 is overcome, and the vehicle 1 is caused to approach the shell. At the same time as the vehicle returns towards its former path, the distance between the vehicle 1 and shell P is reduced and the push rod 5 is displaced relatively to the vehicle 1 in the opposite direction to previously, after which the wheels via the links 21, 20, 22 are gradually returned towards their initial direction as the vehicle 1 approaches its original track. The regulation of the wheels just described is evident from FIGURES 5 and 6, which show two different wheel positions.

The path of movement of the vehicle 1 is adjusted automatically when it tends to approach the shell.

As previously mentioned, the auxiliary vehicle may also be used for welding the outside of the tank. Furthermore the rod 20 may be arranged to sense directly the curvature of shell belt in order to adjust the angle of the wheels 1b in accordance therewith. Since it is of the greatest importance that the welding head of the welding carriage 8 follows the joint which is to be welded, it has been a problem to be able to find an arrangement which locates the welding head. It is possible to visualise guiding it in the joint which is in the course of being welded. This however has proved in practice to be impossible since several welding beads are required to fill a joint completely. The remaining surfaces of the joint after a welding bead are so damaged that the joint cannot serve as a guide groove for a roller or the like.

According to the invention the arrangement shown in FIGURE 7 is therefore proposed, according to which a first joining welding head 30 is applied by hand welding on the exterior of the tank. This hand weld does not affect the edge 31 of the wheel 16. FIGURE 7 shows the final phase in the construction of the tank, in which the welding of the whole tank above the shell belt P1 has been completed. The shell belts P1, P2 and P3 are connected together by welding beads 15 and 30 on the exterior of the tank. Automatic welding is in progress in the joint 33 while the welding head 8a is guided by the welding carriage in the lower joint 34. Before the last joint 34 is welded automatically, the base plate 1a is welded to the shell belt P3, and the base plate can thereafter serve as a guide or surface for the wheels of the welding carriage as shown in chain lines 16a at the bottom in FIGURE 7. When the jacks are disassembled at this stage of the work, the platform of the auxiliary vehicle may be lowered a distance corresponding to the height of a shell belt, and automatic welding takes place as described earlier.

What I claim is:

1. An automatic welding apparatus for welding a joint between the top edge of a plate to the bottom edge of a welded construction located above it, said apparatus comprising:
    (a) transport means;
    (b) a welding carriage having a welding head and a guide member located a predetermined distance beneath said welding head and adapted to engage a support surface parallel with the bottom edge of said welded construction so that when said guide member is in engagement with said support surface said welding head is located opposite said joint.
    (c) a pivotal connection between said carriage and transport means such that said welding head is movable horizontally and vertically relatively to said transport means, said pivotal connection including biasing means adapted to force said carriage towards said plate;
    (d) means responsive to the position of said transport means relative to said welded construction and operative to control the position of said transport means relative to said welded construction.

2. An automatic welding apparatus for welding a joint between the top edge of a plate to the bottom edge of a welded construction located above it, said apparatus comprising:
    (a) transport means;
    (b) a welding carriage having a welding head and a guide member located a predetermined distance beneath said welding head and adapted to engage a support surface parallel with the bottom edge of said welded construction so that when said guide member is in engagement with said support surface said welding head is located opposite said joint,
    (c) a pivotal connection between said carriage and vehicle such that said welding head is movable horizontally and vertically relatively to said vehicle, said pivotal connection including a resiliently biased parallelogram linkage adapted to force said carriage towards said plate; and
    (d) means responsive to the position of said parallelogram linkage and operative to control the position of said transport means relatively to said welded construction.

3. An automatic welding apparatus for use in the construction of cylindrical metal tanks constructed by forming a top part of the tank, raising the top part of the tank, and then welding the joint between the top edges of plates to the bottom edge of said top part, said apparatus comprising:
  (a) a wheeled vehicle having a drive motor and a pair of steerable wheels;
  (b) two links pivotally mounted in said vehicle, said links in use lying in a substantially vertical and radial plane;
  (c) a horizontal push rod pivotably mounted in the free ends of said links so that said links with said push rod constitute a parallelogram linkage;
  (d) a resilient device biasing said links radially towards said plates;
  (e) a welding carriage comprising a guide roller adapted to engage the top edge of a bottom part of said tank, said top edge being parallel to the bottom edge of said top part, a welding head spaced a predetermined distance from said guide roller such that it is opposite said joint when said guide roller is in engagement with said top edge, a motor for driving said guide roller at substantially the same speed as said drive motor of said vehicle, and a pair of circumferentially spaced abutment rollers located above said welding head and adapted to engage said top part;
  (f) a pivotal connection between said push rod and said welding carriage, said connection comprising a link pivotally connected to said push rod about the axis of said push rod, a second link pivotally connected to said first link about an axis parallel to the axis of said push rod, and a resilient interconnection between said second link and said welding carriage; and
  (g) a rod pivotally interconnecting said parallelogram linkage and said steerable wheels such that movement of said vehicle away from said tank, by virtue of said resilient device biasing said links towards said tank, turns said wheels so that said vehicle moves towards said tank and conversely.

4. An automatic welding apparatus for use in the construction of cylindrical metal tanks constructed by forming a top part and bottom belt of the tank, raising the top part of the tank, and then welding the joint between the top edges of plates to the bottom edge of the top part, said apparatus comprising:
  (a) a wheeled vehicle;
  (b) two links pivotably mounted in said vehicle;
  (c) a holder pivotably mounted on the free end of each link;
  (d) a horizontal push rod clampable in a selected position in said holders, said links constituting with said push rod a parallelogram linkage;
  (e) a resilient device biasing said links towards said plates;
  (f) a welding carriage comprising a guide roller adapted to engage the top edge of said bottom belt, a welding head spaced a predetermined distance from said guide roller such that it is opposite to said joint, and a motor for driving said guide roller;
  (g) a pivotal connection between said push rod and said welding carriage, said connection comprising a link pivotally connected to said push rod about a horizontal axis parallel to the plane of said parallelogram linkage, a second link pivotally connected to said first link about an axis parallel to the axis of said push rod, and a universal interconnection between said second link and said welding carriage; and
  (h) means to maintain said vehicle the desired distance from said tank.

5. An automatic welding apparatus for use in the construction of cylindrical metal tanks constructed by forming a top part of the tank, raising the top part of the tank, and then welding the joint between the top edges of plates to the bottom edge of said top part, said apparatus comprising:
  (a) transport means;
  (b) two links pivotably mounted in said transport means;
  (c) a holder pivotably mounted on the free end of each link;
  (d) a horizontal push rod fixable in a selected position in said holders so that said links constitute a parallelogram linkage which in use is radial in relation to said tank;
  (e) a resilient device biasing said links towards said plates;
  (f) a welding carriage comprising a guide member adapted to engage the top edge of said bottom belt, and a welding head spaced a predetermined distance from said guide roller such that it is opposite said joint;
  (g) a linkage mechanism at the end of said push rod such that said carriage is movable horizontally and vertically relatively to said push rod;
  (h) a restricted universal connection between said linkage mechanism and said welding carriage; and
  (i) means responsive to the position of said transport means and operative to control said transport means to maintain said welding head at the desired distance from said joint.

6. A welding apparatus for use in the construction of cylindrical metal tanks constructed by forming a top part, raising the top part of the tank, and then welding the joint betwee nthe top edges of plates to the bottom edge of said top part, said apparatus comprising:
  (a) a wheeled vehicle having a drive motor and a pair of steerable wheels;
  (b) two links pivotably mounted in said vehicle about a horizontal axis tangential in use to said tank;
  (c) a holder pivotably mounted at the free end of each of said links;
  (d) a horizontal push rod fixable in a selected position in said holders so that said links with said push rod constitute a parallelogram linkage;
  (e) a resilient device biasing said links towards said plates;
  (f) a welding carriage comprising a pair of guide rollers spaced circumferentially apart and adapted to engage a surface parallel to the bottom edge of said upper part, a welding head spaced a predetermined distance from said guide rollers such that it is opposite said joint, a motor for driving one of said guide rollers at substantially the same speed as said drive motor of said vehicle, and a pair of circumferentially spaced abutment rollers located above said welding head and adapted to engage said top part;
  (g) a pivotal connection between said push rod and said welding carriage, said connection comprising a link pivotally connected to said push rod about the axis of said push rod, a second link pivotally connected to said first link about an axis parallel to the axis of said push rod, and a rubber mass interconnecting between said second link and said welding carriage; and
  (h) a rod pivotally interconnecting said parallelogram linkage to said steerable wheels such that movement of said vehicle away from said tank, by virtue of said resilient device biasing said links towards said tank, turns said wheels so that said vehicle moves towards said tank and conversely.

7. An automatic welding apparatus for welding a joint between the top edge of a plate and the bottom edge of a welded construction located above it, said apparatus comprising:
- (a) a wheeled vehicle having a drive motor;
- (b) a welding carriage having a welding head and a guide roller located a predetermined distance beneath said welding head and adapted to engage a support surface parallel with the bottom edge of said welded construction so that when said guide roller is in engagemetn with said support surface said welding head is located opposite said joint, said guide roller being drivable by a motor at substantially the same speed as said vehicle is driven;
- (c) a parallelogram linkage mounted on said vehicle and having a pair of horizontal sides, one of said horizontal sides constituting a push rod;
- (d) a spring biasing said push rod towards said plate;
- (e) a linkage mechanism interconnecting said push rod and said welding carriage, said mechanism permitting vertical and horizontal movement of said carriage relatively to said vehicle; and
- (f) means to maintain said vehicle at the desired distance from said welded construction.

8. An automatic welding apparatus for welding a joint between a plate and a welded construction, said apparatus comprising:
- (a) a vehicle having a drive motor;
- (b) a welding carriage having a welding head and a guide roller vertically spaced from said welding head and adapted to engage a support surface vertically spaced from said joint that when said guide roller is in engagement with said support surface said welding head is located opposite said joint, said guide roller being drivable by a motor at substantially the same speed as said vehicle is driven;
- (c) a parallelogram linkage mounted in a vertical plane on said vehicle and having a pair of horizontal sides, one of said horizontal sides constituting a push rod;
- (d) a spring biasing said push rod towards said plate; and
- (e) a linkage mechanism interconnecting said push rod and said welding carriage, said mechanism permitting vertical and horizontal movement of said carriage relatively to said vehicle.

9. An automatic welding apparatus for welding a joint between a plate and a welded construction, said apparatus comprising:
- (a) transport means;
- (b) a welding carriage having a welding head and a guide member spaced from said welding head and adapted to engage a support surface spaced from said joint so that when said guide roller is in engagement with said support surface said welding head is located opposite said joint, said guide roller being drivable by a motor;
- (c) a parallelogram linkage mounted on said transport means, one of the sides of said linkage constituting a push rod;
- (d) a spring biasing said push rod towards said plate;
- (e) a linkage mechanism interconnecting said push rod and said welding carriage, said mechanism permitting vertical and horizontal movement of said carriage relatively to said vehicle and resiliently restricted movement in other directions; and
- (f) means responsive to the position of said transport means relatively to said welded construction to control said transport means to maintain said transport means at the desired distance from said welded construction.

10. An automatic welding apparatus for welding a joint between a plate and a welded construction, said apparatus comprising:
- (a) a wheeled vehicle having a drive motor and a pair of wheels;
- (b) a welding carriage having a welding head and a guide roller vertically spaced from said welding head and adapted to engage a support surface vertically spaced from said joint so that when said guide roller is in engagement with said support surface said welding head is located opposite said joint, said guide roller being drivable by a motor at substantially the same speed as said vehicle is driven;
- (c) a parallelogram linkage mounted in a vertical plane on said vehicle and having a pair of horizontal sides, one of said horizontal sides constituting a push rod;
- (d) a spring biasing said push rod towards said plate; and
- (e) a linkage mechanism interconnecting said push rod and said welding carriage, said mechanism comprising a first link pivotally connected about the axis of said rod to said rod, a second link connected about a parallel axis to said latter axis to the opposite end of said first link, and a rubber mass connecting the opposite end of said second link to said welding carriage.

11. Apparatus for forming the sidewall of an upright cylindrical tank having a horizontal base by a method which comprises successively raising tank side wall sections upwardly to permit a further section to be fitted and welded to the lower edge of the raised sections, said apparatus comprising a wheeled vehicle traveling on the base of the tank being formed, a first motor on the vehicle for driving the vehicle, a vertically disposed welding carriage carried by the vehicle, means connecting the carriage to the vehicle, means on the carriage for driving said carriage around the tank on the vertical shell surface thereof, a second motor on the carriage for driving the last named means, a support on the carriage, a welding head mounted on the support, and means on the carriage for engagement with at least one horizontal groove between the sections of the sidewall of the tank, the means connecting the carriage and the vehicle comprising a coupling permitting pivotal relative movement between the carriage and vehicle in vertical and horizontal directions whereby the welding carriage remains in its correct position on the wall of the tank despite deviations between the vertical plane of the welding carriage and the horizontal plane of the vehicle.

References Cited by the Examiner
UNITED STATES PATENTS

| | | | |
|---|---|---|---|
| 1,825,968 | 10/31 | Mapson | 104—63 |
| 2,109,403 | 2/38 | Roussy et al. | 104—60 |
| 2,439,740 | 4/48 | Johnson | 219—125 |
| 3,072,779 | 1/63 | Masters et al. | 219—125 |

RICHARD M. WOOD, *Primary Examiner.*